F. PAMPINELLA.
VIBRATION RECORDER.
APPLICATION FILED MAY 26, 1920.
1,413,771.
Patented Apr. 25, 1922.
2 SHEETS—SHEET 1.
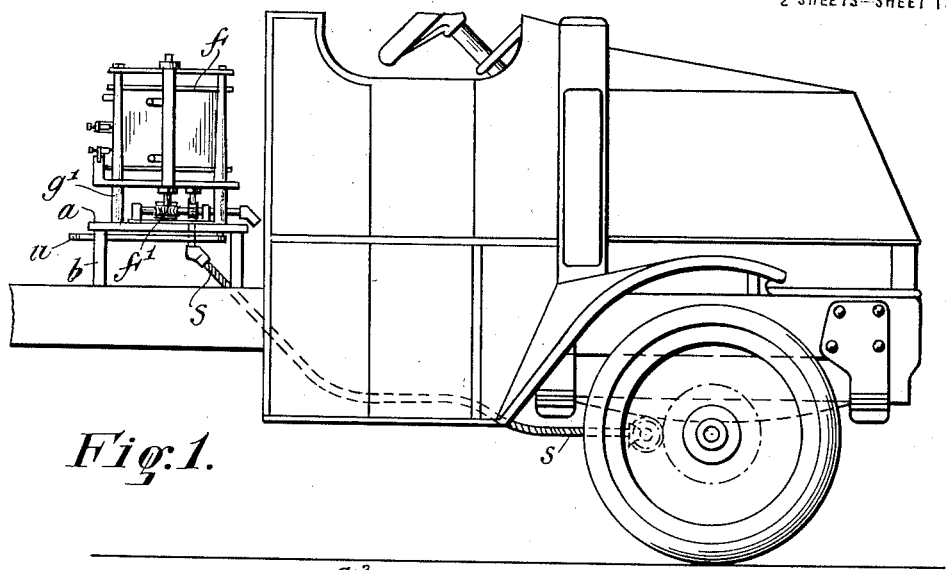
Fig. 1.
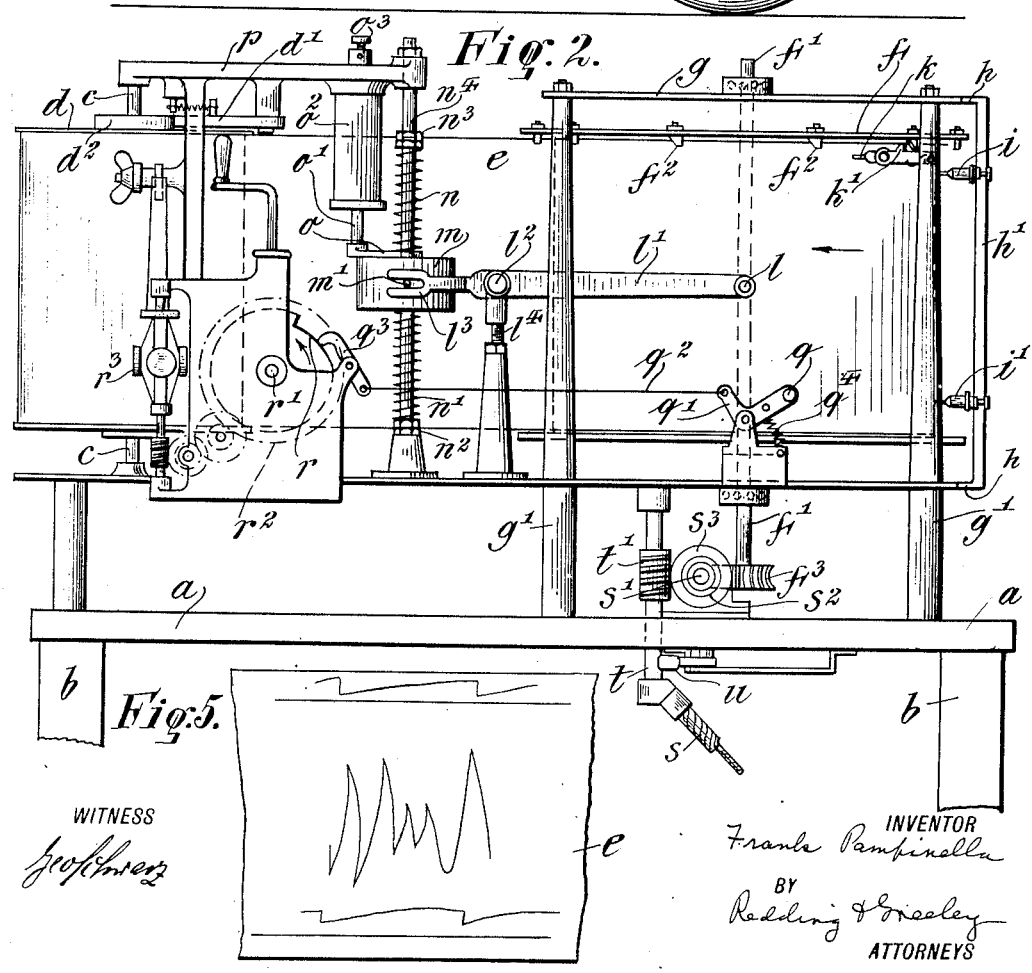
Fig. 2.
Fig. 5.
WITNESS
INVENTOR
Frank Pampinella
BY
Redding & Greeley
ATTORNEYS F. PAMPINELLA.
VIBRATION RECORDER.
APPLICATION FILED MAY 26, 1920.
1,413,771.
Patented Apr. 25, 1922.
2 SHEETS—SHEET 2.
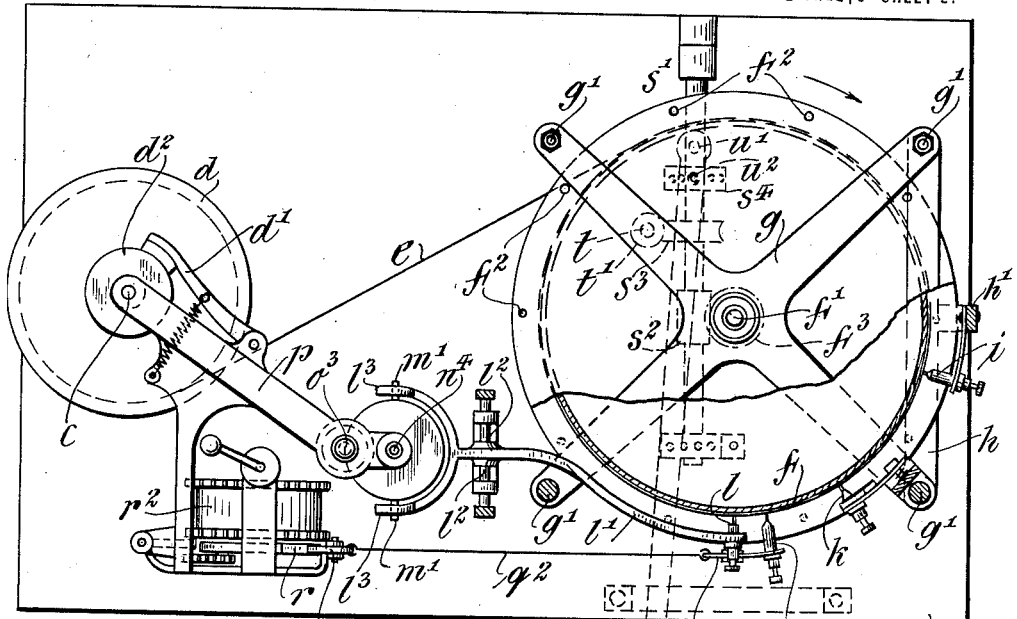
Fig. 3.
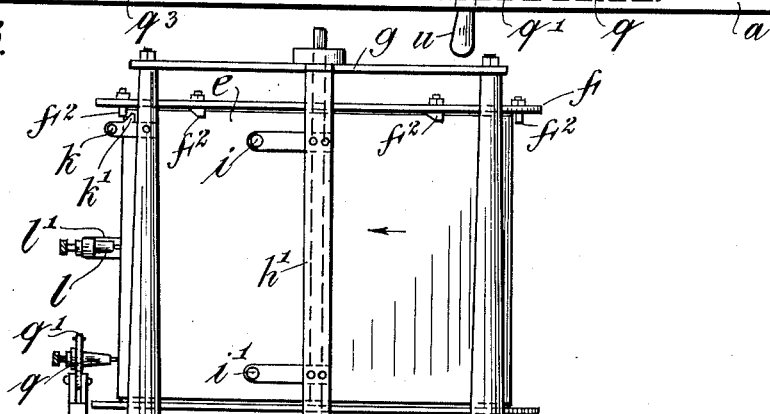
Fig. 4.
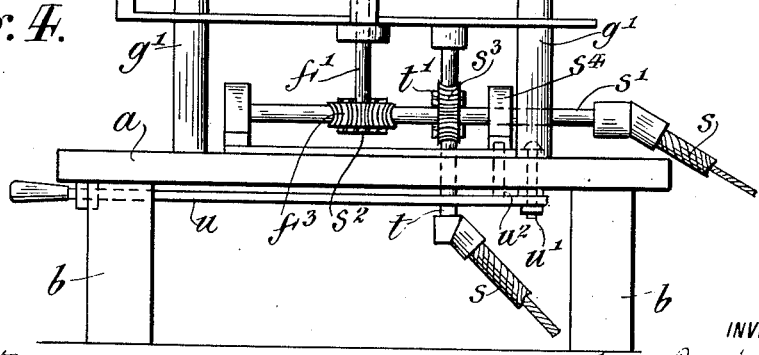
WITNESS
INVENTOR
Frank Pampinella
BY
Redding & Greeley
ATTORNEYS

UNITED STATES PATENT OFFICE.

FRANK PAMPINELLA, OF BROOKLYN, NEW YORK, ASSIGNOR TO INTERNATIONAL MOTOR COMPANY, OF NEW YORK, N. Y., A CORPORATION OF DELAWARE.

VIBRATION RECORDER.

1,413,771.  Specification of Letters Patent.  Patented Apr. 25, 1922.

Application filed May 26, 1920. Serial No. 384,431.

*To all whom it may concern:*

Be it known that I, FRANK PAMPINELLA, a citizen of the United States, residing in the borough of Brooklyn of the city of New York, in the State of New York, have invented certain new and useful Improvements in Vibration Recorders, of which the following is a specification, reference being had to the accompanying drawings, forming a part hereof.

This invention relates to an instrument for recording road shocks to which the chassis of a motor vehicle is subjected, the instrument by reason of its function in indicating shocks received from the earth being termed herein a vibration recorder. In automobiles there are, of course, a great many variable factors entering into the riding condition of the road and the absorption of road shocks. It is desirable to have an instrument which will indicate the resulting shocks to which the chassis is subjected so that by comparative charts and introducing variable supporting or suspension elements between the chassis and the road the effect of any one of these elements can be readily observed. For instance, tires differ in their effect on the riding qualities of a car as to springs, shackles, and frame construction. The improved instrument not only shows on a chart the character of the shocks to which the chassis is subjected, but also the comparative riding qualities at different speeds of the vehicle. The chart employed is arranged to give an indication of the speed of the vehicle as well as the extent of the shock. It is proposed, in accordance with the invention, to arrange for variable speeds of the moving chart, as under different road conditions and variable speed conditions it may be desirable to have the chart move at different speeds. Some of the characteristic features of the elements employed in the recording instrument have to do with the means for supporting a vibratory mass and for cushioning its movements to any degree desired, so as to limit the amplitude of movements; the governing to a nicety of the time graduations whereby the speed of the vehicle at any instant is determined; and the construction and arrangement of recording styluses to enable a simple graphic chart to be obtained for comparative purposes with charts made on other vehicles.

Reference is now to be had to the accompanying drawings for a detailed description of one suitable embodiment of the invention, in which—

Figure 1 is a view in side elevation of a fragment of a motor truck having applied thereto the improved vibration recorder.

Figure 2 is a detail view in elevation of the improved vibration recorder showing the relation of the marking styluses to the traveling chart.

Figure 3 is a view in plan of the instrument shown in Figure 2.

Figure 4 is a view in end elevation of the instrument and showing particularly the means for obtaining different speeds of the chart.

Figure 5 is a view of a fragment of a chart made on the instrument.

The vibration recorder may be carried on a suitable support $a$ adapted to rest on the side frame members $b$ of the vehicle whose chassis riding qualities are to be determined. On the base $a$ is supported on a vertical spindle $c$ a feed roll $d$ carrying a recording chart $e$. This roll $d$ is held against free movement by means of a spring-pressed brake shoe $d'$ engaging a brake drum $d^2$ carried with the roll. The roll is fed on a revolving drum $f$ mounted on a vertical shaft $f'$ and carrying with it, preferably on its upper end plate, a series of cam pieces $f^2$ spaced at regular intervals for a purpose which will appear. The upper bearing for the shaft $f'$ of the drum $f$ is formed in a spider $g$ which is supported on vertical standards $g'$ resting on the base $a$. On the standards $g'$ may be carried a bracket $h$ having a vertical section $h'$ to which are secured styluses or pencils $i$, $i'$, adapted to bear against the chart $e$ adjacent the upper and lower edges thereof, respectively. On one of the standards $g'$ is supported yieldingly a stylus or pencil $k$, the carrier arm of which is formed with a cam $k'$ for engagement by the cam pieces $f^2$ during rotation of the drum. The effect of this engagement is to trip the pencil $k$ and cause vertical delineations on the face of the chart at regular intervals.

The pencil for recording on the face of the chart the road shocks which are transmitted to the chassis is indicated at $l$ and is supported on the end of an arm $l'$ which is pivoted fixedly, as at $l^2$, and engages at its other end $l^3$, a weighted mass $m$. A convenient connection permitting free oscillation of the arm $l'$ is found in a bifurcated end $l^3$ and a pin $m'$ carried by the weight $m$ and resting in the bifurcated portion. The mass $m$ is supported floatingly by means of upper and lower springs $n$, $n'$, respectively interposed between the weight and adjustable stops $n^2$, $n^3$, respectively, which may conveniently be threaded on a fixed rod $n^4$. The position of the arm $l'$ can be adjusted initially by means of a screw-threaded supporting stem $l^4$, which carries the fixed pivot $l^2$. Against the upper face of the weight $m$ bears an arm $o$ fixed to a plunger $o'$ adapted to reciprocate within an air cylinder $o^2$, this cylinder being provided with an adjustable bleed port $o^3$ by which the resistance offered to free movement of the plunger within the cylinder and the resistance thereby offered to vertical oscillations of the weight $m$ can be readily adjusted. The cylinder $o^2$ may be carried conveniently on a standard arm $p$ supported on the base $a$.

Another pencil $q$ is adapted to bear against the chart $e$ adjacent its lower edge, this pencil being mounted in one arm of an elbow lever $q'$ which is connected by the other arm through a rod or cord $q^2$ to a spring-pressed trip $q^3$, one end of which rides on the surface of a rotatable cam $r$. The cam $r$ is fixed on a rotatable shaft $r'$ of any suitable motor which will move at a fixed rate of speed. In the illustrated embodiment a spring motor $r^2$ is shown, and this motor is connected through suitable gearing to a centrifugal ball governor $r^3$ by which its speed may be fixed to a nicety and all variations eliminated. A spring $q^4$ holds the bell crank $q'$ in one extreme position against the action of the spring-pressed trip $q^3$.

The shaft $f'$ on which the drum $f$ is mounted is driven by any suitable gearing from any part of the vehicle which moves in direct proportion to the vehicle speed. One convenient connection will be to the usual speedometer cable $s$ which is geared to the front wheel of the car. This cable may be connected at any free end to a shaft $s'$ on which is carried a worm $s^2$ adapted to mesh with a worm wheel $f^3$ on the lower end of the shaft $f'$. Such a connection causes the drum $f$ to rotate at a speed in a certain fixed proportion to the speed of the vehicle. If under some conditions of operation it is desired to rotate the drum $f$ at a different speed the cable $s$ may be connected operatively to another shaft $t$ which may be supported vertically in the base $a$ and carry a worm $t'$ engageable by a worm wheel $s^3$ on the shaft $s'$. By means of a hand lever $u$, pivoted as at $u'$ on the underside of the base $a$ and engaged with a sliding bearing $s^4$ for the shaft $s'$ the shaft $s'$ may be swung laterally to move the worm wheel $s^3$ into or out of engagement with the worm $t'$ thereby giving selective speeds of rotation for the shaft $f'$. The lever $u$ may be connected to the sliding bearing $s^4$ by means of a pin $u^2$.

In the operation of the instrument the cable $s$ is first connected to either the shaft $t$ or to the shaft $s'$ depending upon the speed ratio of the drum desired. The hand lever $u$ is swung to mesh the gears $s^3$, $t'$ or unmesh them according to which speed ratio is to be used. In one preferred type the drum $f$ is driven from the wheel of the truck so as to give one rotation of the drum per mile. When the test run is to be commenced the motor $r^2$ is set in operation so that at predetermined time intervals the trip $q^3$ will be actuated by the cam $r$ so as to move the pencil $q$ vertically and indicate on the face of the chart equal time intervals. In one embodiment this motor has been so regulated as to trip the pencil $q$ once every minute. Upon rotation of the drum $f$ the cam pieces $f^2$ will be brought successively into engagement with the cam $k'$ on the arm of the pencil $k$ so as to trip this pencil at regular intervals of travel of the vehicle. In one embodiment these cam pieces $f^2$ have been so spaced as to trip the finger $k$ for every tenth of a mile traveled by the vehicle. The pencils $i$, $i'$ bear constantly against the face of the chart $e$ so as to delineate parallel lines adjacent the opposite edges thereof. As shown in Figure 5 it will be evident that if the pencil $k$ is tripped to give a vertical delineation for every tenth of a mile of vehicle travel and the lower pencil $q$ is tripped to give a vertical delineation for every minute of time, it becomes a very simple matter to estimate at any part of the chart the speed of the vehicle. The main recording pencil $l$ is set to rest against the chart $e$ at approximately its midpoint, the weight $m$ being supported to hold the pencil at about such point so long as no shocks are transmitted to the chassis. When a shock is transmitted to the chassis the weight $m$ oscillates against the actions of the springs $n$, $n'$ and moves upwardly against the air check afforded by the cylinder $o^2$ and plunger $o'$. By adjusting the bleed port $o^3$ in the air cylinder $o^2$ the amplitude of vibration of the weight $m$ and the pencil $l$ can readily be adjusted within necessary limits. All shocks on the chassis are recorded by the pencil $l$ by means of vertical lines drawn across the face of the chart as indicated in Figure 5. After a vehicle has been given a run over a given course and a chart prepared showing the character of the shocks indicated by the pencil $l$ any one of the factors affecting the riding qualities, such as tires, springs or frame, can be changed and another run made over the same course to obtain a comparative chart. The character and amplitude of the oscillations of the pencil $l$ will readily indicate for any given speed just how the riding qualities are affected by changing any one of said factors.

As pointed out hereinbefore, if it is desired to have the chart $e$ travel at a greater speed so that the drum $f$ will make a greater number of revolutions per mile of travel the cable $s$ can be so connected to the other of the shafts $s'$, $t$ as to give a greater speed ratio.

Further, it is to be understood that the invention is not to be limited to the precise mechanical details described herein nor to the precise character of the units employed, since, for instance, some other kind of motor than that shown herein may be used for tripping the pencil $q$ periodically. The importance of the present invention is to afford an accurate indicating device for putting in permanent record form the character of the riding qualities of any particular chassis mounted on a vehicle with tires, springs or frames of certain designs.

I claim as my invention:

1. In apparatus for indicating the riding qualities of a chassis, a base on the chassis to support the apparatus, a chart, a drum on to which the chart is wound, means to rotate the drum from the running gear of the vehicle, a stylus movable across the face of the chart, a weighted mass carried with the stylus and movable under chassis shocks to move the stylus, adjustable means to limit the amplitude of movement of said mass, said means including an air cylinder provided with an adjustable bleed port, a plunger reciprocable within said cylinder and engaging the weighted mass and opposed springs to hold the stylus yieldingly in medium position.

2. In apparatus for indicating the riding qualities of a chassis, a base on the chassis to support the apparatus, a chart, a drum on to which the chart is wound, means to rotate the drum from the running gear of the vehicle, a stylus bearing against the face of the chart and operable by the drum at even intervals of linear travel of the vehicle to indicate predetermined distances, a stylus movable across the face of the chart and carried with a weighted mass movable under chassis shocks to move the stylus, a third stylus engaging the face of the chart, and means operable at predetermined intervals of time to operate said last named stylus to indicate the passage of such units of time, whereby the vehicle speed may be interpolated from the chart and the severity of shocks noted at any speed.

This specification signed this 13th day of May, A. D. 1920.

FRANK PAMPINELLA.